United States Patent
Wakhare et al.

(10) Patent No.: US 10,540,341 B1
(45) Date of Patent: Jan. 21, 2020

(54) SYSTEM AND METHOD FOR DEDUPE AWARE STORAGE QUALITY OF SERVICE

(71) Applicant: Veritas Technologies LLC, Mountain View, CA (US)

(72) Inventors: Prasanna Wakhare, Mountain View, CA (US); Sudhakar Paulzagade, Mountain View, CA (US); Saurabh Jain, Mountain View, CA (US)

(73) Assignee: Veritas Technologies LLC, Mountain View, CA (US)

( * ) Notice: Subject to any disclaimer, the term of this patent is extended or adjusted under 35 U.S.C. 154(b) by 616 days.

(21) Appl. No.: 15/087,345

(22) Filed: Mar. 31, 2016

(51) Int. Cl.
*G06F 16/23* (2019.01)
*G06F 16/2458* (2019.01)
*H04L 12/851* (2013.01)
*G06F 13/10* (2006.01)

(52) U.S. Cl.
CPC ........ *G06F 16/2365* (2019.01); *G06F 13/102* (2013.01); *G06F 16/2477* (2019.01); *H04L 47/2441* (2013.01); *H04L 47/2483* (2013.01)

(58) Field of Classification Search
CPC ............ G06F 17/30371; G06F 13/102; G06F 17/30551; G06F 16/215; G06F 16/217; G06F 16/2365; G06F 16/2477; H04L 47/2441; H04L 47/2483
USPC ........................................................ 707/692
See application file for complete search history.

(56) References Cited

U.S. PATENT DOCUMENTS

| | | | |
|---|---|---|---|
| 9,864,658 B1* | 1/2018 | Barcello | G06F 11/1453 |
| 2002/0141446 A1* | 10/2002 | Koga | H04L 12/4625 370/468 |
| 2009/0010156 A1* | 1/2009 | Song | H04L 12/2803 370/230 |
| 2011/0099154 A1* | 4/2011 | Maydew | G06F 17/30156 707/692 |
| 2014/0258244 A1* | 9/2014 | Rao | G06F 17/30159 707/692 |
| 2016/0255016 A1* | 9/2016 | Miller | H04L 47/805 709/217 |
| 2017/0091232 A1* | 3/2017 | Ghanbari | G06F 16/215 |

* cited by examiner

*Primary Examiner* — Michael Pham
(74) *Attorney, Agent, or Firm* — Patent Law Works LLP

(57) ABSTRACT

A system and method for implementing a Quality of Service based upon data deduplication is provided. The method may include deduplicating data and receiving a corresponding I/O request; wherein the data includes an associated dedupe count. The method may further include performing the I/O request based upon the dedupe count. For example, where no deduplication exists as indicated by a dedupe count of zero, the I/O request may be scheduled for processing when the sum of the current clock tick and the tag ratio are less than or equal to the next clock tick. In the alternative, where deduplication exists as indicated by a dedupe count that is greater than zero, the I/O request may be scheduled for processing, when the sum of the current clock tick, a negative value of the dedupe ratio, and the tag ratio are less than or equal to the next clock tick.

13 Claims, 4 Drawing Sheets

SYSTEM AND METHOD FOR DEDUPE AWARE STORAGE QUALITY OF SERVICE

BACKGROUND

Deduplicating data systems are often able to reduce the amount of storage space needed to store files by recognizing redundant data patterns. For example, a conventional deduplicating data system may reduce the amount of storage space needed to store similar files by dividing the files into data segments and storing only unique data segments. In this example, each deduplicated file stored within the deduplicating data system may be represented by a list of mapped locations (references) to those data segments that make up the file.

Within telephony or computer networks, data centers used to house telecommunication and storage systems provide differing tiers associated with a quality of service (QoS) to users, where QoS is the ability to provide different priority to different applications, users, or data flows, or to guarantee a certain level of performance to a data flow. For example, a required bit rate, delay, jitter, packet dropping probability and/or bit error rate may be guaranteed. When network capacity is insufficient, QoS guarantees are vital for various real-time streaming multimedia applications, such as voice over IP, online games, IP-TV, and the like. These applications often are delay sensitive and as a result, require a fixed bit rate. Further, in networks, bandwidth capacity may be a limited resource in cellular data communication, for example.

In particular, within a storage environment associated with a network, QoS performance isolation may be provided by guaranteeing a certain bandwidth assigned to an application, file, client, and the like. For example, credits may be granted to each application based on a Service-Level Agreement (SLA), underlying storage capacity, and demand, where the SLA is a standardized service contract that formally defines the scope, quality, responsibilities associated with the service. However, current storage QoS solutions do not account for deduplicated I/O requests, where the underlying storage stack within a storage controller for a storage area network uses deduplication.

While conventional deduplicating data systems may reduce the storage space required to store files, the mechanisms used by such conventional systems to manage deduplicated data fail to account for the amount of data that has been deduplicated. Further, in a traditional file system, large amounts of deduplicated data may exist when processing Input/Output (I/O) requests, such as read or write requests. Yet, these I/O requests may be queued based upon the initial bandwidth assigned to the application without giving account of the deduplicated data or the current bandwidth available. However, due to the deduplication process, there exists extra storage bandwidth, which is not taken into account when allocating I/O requests. That is, conventional systems do not account for additional storage bandwidth resulting from a deduplication, which could be allocated based upon the SLA agreement, where storage is allocated on different tiers. For example, if an application has a dedupe ratio of 50%, then it actually uses only 50% of its assigned bandwidth. Yet, current QoS solutions have no mechanism to account for the dedupe ratio which is application dependent. This results in underutilization of the underlying storage, where the dedupe ratio of the application is proportional to the loss or underutilization of storage. It is within this context that the embodiments arise.

SUMMARY

Embodiments of a system and method for implementing a Quality of Service based upon data deduplication are provided. It should be appreciated that the present embodiment can be implemented in numerous ways, such as a process, an apparatus, a system, a device, or a method. Several inventive embodiments are described below.

In some embodiments, a system and method for implementing a Quality of Service based upon data deduplication is provided. The method may include receiving an I/O request before, during or after deduplicating the data. The method may further include detecting a dedupe count associated with the deduplicated data and performing the I/O request associated based upon the dedupe count. For example, where no deduplication exists as indicated by a dedupe count of zero, the I/O request may be scheduled for processing when the sum of the current clock tick and the tag ratio are less than or equal to the next clock tick (the current clock tick incremented by one). In the alternative, where deduplication exists as indicated by a dedupe count that is greater than zero, the I/O request may be scheduled for processing, when the sum of the current clock tick, a negative value of the dedupe ratio, and the tag ratio are less than or equal to the next clock tick.

In some embodiments, a storage controller is provided. The storage controller may comprise a processor coupled to a memory, where the processor is operable to deduplicate data. The processor may also be operable to receive an I/O request and to detect a dedupe count associated with the deduplicated data for an application. Further, the processor may be operable to perform the I/O request in a storage unit based upon the dedupe count. For example, the processor may be operable to process the I/O request when the dedupe count is equal to 0, given the sum of the current clock tick, and the tag ratio are less than or equal to the next clock tick. In the alternative, the processor may be operable to process the I/O request when the dedupe count is greater than 0, given the sum of the current clock tick, a negative value of the dedupe ratio, and the tag ratio are less than or equal to the next clock tick.

In some embodiments, a tangible, non-transitory, computer-readable media having instructions whereupon which, when executed by a processor, cause the processor to perform the dedupe aware method for QoS described herein. The method may include receiving an I/O request before, during or after deduplicating the data. The method may further include detecting a dedupe count associated with the deduplicated data and performing the I/O request associated based upon the dedupe count. For example, where no deduplication exists as indicated by a dedupe count of zero, the I/O request may be scheduled for processing when the sum of the current clock tick and the tag ratio are less than or equal to the next clock tick. In the alternative, where deduplication exists as indicated by a dedupe count that is greater than zero, the I/O request may be scheduled for processing, when the sum of the current clock tick, a negative value of the dedupe ratio, and the tag ratio are less than or equal to the next clock tick.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1:
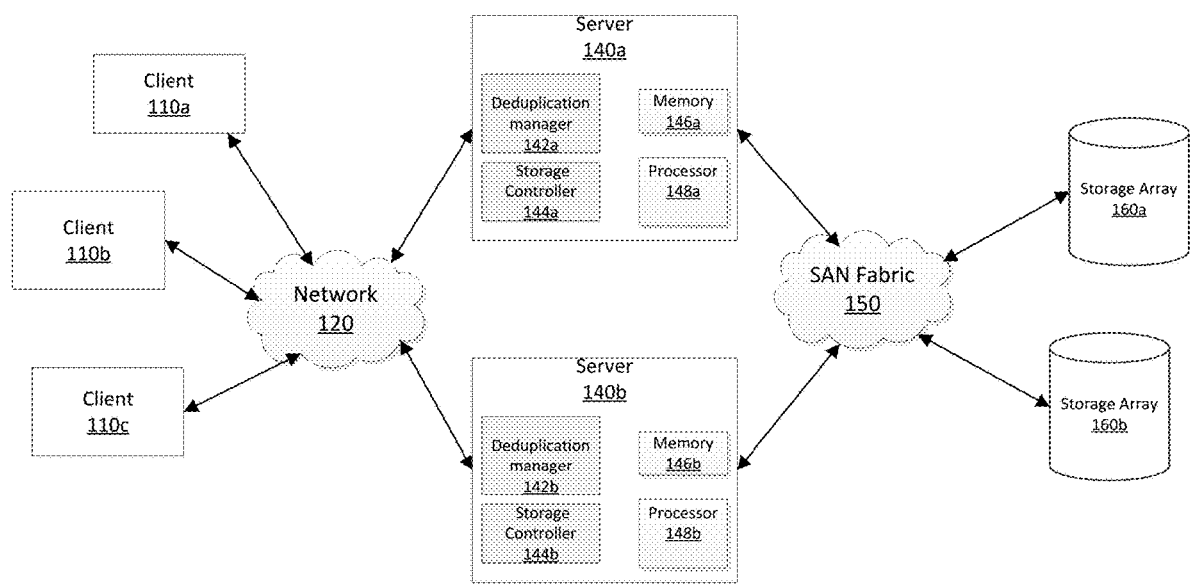
FIG. 1 is a block diagram of an exemplary operating environment having a storage management server coupled to multiple storage nodes to provide dedupe aware QoS, in accordance with some embodiments.

The following embodiments describe a system and method for implementing a Quality of Service based upon data deduplication. It can be appreciated by one skilled in the art, that the embodiments may be practiced without some or all of these specific details. In other instances, well known process operations have not been described in detail in order not to unnecessarily obscure the embodiments.

The system and method for implementing a Quality of Service based upon data deduplication may include receiving an I/O request before, during or after deduplicating the data. The method may further include detecting a dedupe count associated with the deduplicated data and performing the I/O request associated based upon the dedupe count. For example, where no deduplication exists as indicated by a dedupe count of zero, the I/O request may be scheduled for processing when the sum of the current clock tick and the tag ratio are less than or equal to the next clock tick. In the alternative, where deduplication exists as indicated by a dedupe count that is greater than zero, the I/O request may be scheduled for processing, when the sum of the current clock tick, a negative value of the dedupe ratio, and the tag ratio are less than or equal to the next clock tick.

Embodiments of the storage management server and architecture disclosed herein provide dedupe aware QoS for applications, wherein the storage management server may include a storage controller QoS that distributes the bandwidth of the storage subsystems amongst its applications based on the SLA and the dedupe count. In general, every I/O request scheduled by the QoS consumes assigned bandwidth. In the case where the underlying storage subsystem uses deduplication, however the I/O requests that are deduped do not consume any storage bandwidth of the system. Embodiments of the system and method disclosed herein can assign this unused bandwidth back to the application, when some of the scheduled I/O requests are duplicates; and thereby, allows more I/O requests from the application, making best utilization of storage resources available. In particular, some embodiments of the system and method for dedupe aware QoS may maintain a running dedupe counter, which is incremented by a dedupe driver per every deduped I/O request. Thereby, the dedupe count may be used in determining the scheduling associated with each I/O request. Accordingly, the system and method for implementing the QoS disclosed herein provides an effective solution for accounting for the additional storage space resulting from data deduplication.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, shows a block diagram of an exemplary operating environment having a storage management server coupled to multiple storage nodes to provide dedupe aware QoS, in accordance with some embodiments. Exemplary operating environment 100 includes clients 110a-c, network 120, servers 140a-b, storage area network (SAN) fabric 150, and storage arrays 160a-b. It is appreciated that the components of exemplary operating environment 100 are exemplary and more or fewer components may be present in various configurations. It is appreciated that operating environment may be part of a distributed computing environment, a cloud computing environment, a client server environment, and the like.

Client systems 110a-c access information on storage arrays 160a-b indirectly through servers 140a-b using, for example, a web browser or other suitable client communication software (not shown). Examples of the clients 110a-c may include, but are not limited to, personal computers, laptops, PDAs, mobile phones, network appliances, software applications, tenants, and the like. Servers 140a-b may perform requests received from clients 110a-c. FIG. 1 depicts the use of network 120 such as the Internet for exchanging data, but the present disclosure is not limited to the Internet or any particular network-based environment.

Servers 140a-b can have multiple clients (e.g., clients 110a-c) connected thereto. Servers 140a-b can provide access to data for various types of applications including, but not limited to, database servers, network file system (NFS) servers, and application servers (e.g., billing). For example, applications and servers might have thousands of people accessing them from different locations, thus the applications and servers need to be highly available and the cluster fault tolerant. Servers 140a-b may be linked to storage arrays 160a-b in a variety of ways including, Fibre channel.

Server 140a-b may respectively execute deduplication managers 142a-b, which perform periodic deduplication of data of in storage array 160a-b. Deduplication managers 142a-b can communicate with storage arrays 160a-b indirectly through SAN fabric 150.

Server 140a-b may respectively execute storage controllers 144a-b, which implements a QoS based upon data deduplication in storage array 160a-b. Storage controllers 144a-b can communicate with storage arrays 160a-b indirectly through SAN fabric 150. Storage controllers 144a-b may optimize deduplication by performing QoS based upon data deduplication.

Figure 2:
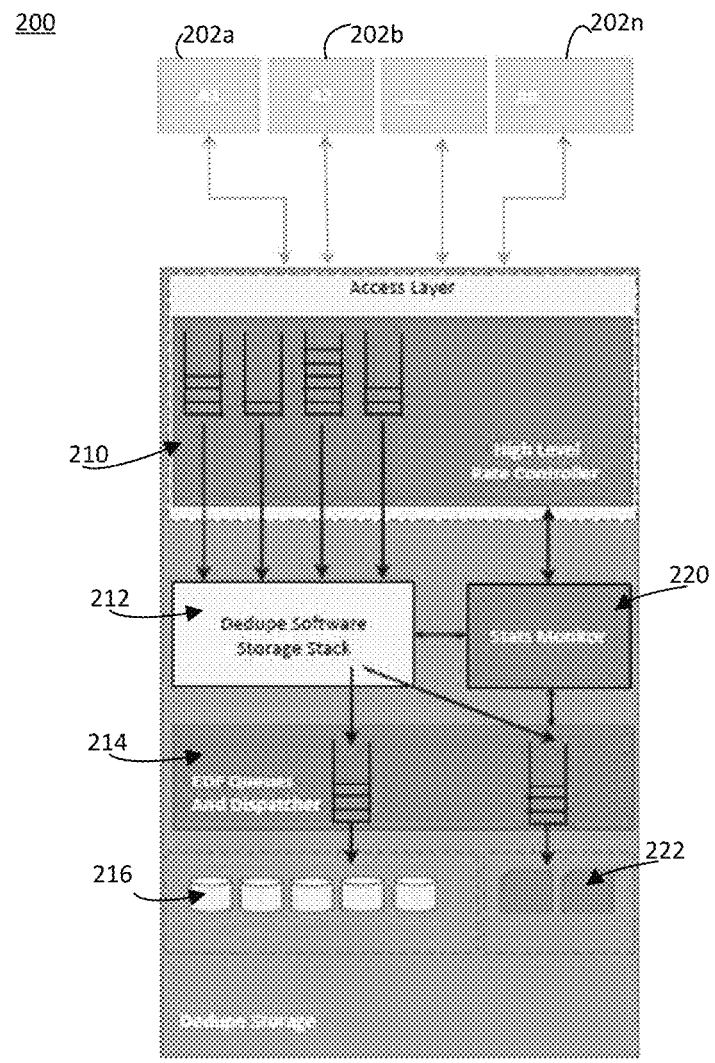
FIG. 2 is a system diagram of an example QoS architecture for the server of FIG. 1 as a storage resource in some embodiments.

FIG. 2 is a system diagram of an example QoS architecture for the server of FIG. 1 as a storage resource in some embodiments. The QoS architecture 200 may comprise a high level rate controller 210, a dedupe software storage stack 212, a stats monitor 220, an Earliest Deadline First (EDF) queues and dispatcher 214, a dedupe storage 216, files 222. As shown, applications 202a-n couple to the storage system 200 to provide I/O requests to the high level rate controller 210. The high level rate controller 210 isolates the application I/O requests into different QoS queues based upon their SLA and schedules the I/O request based upon data deduplication (described further in detail below). The dedupe software storage stack 212 couples to receive the I/O requests from the high level rate controller 210 after the high level rate controller 210 detects that the I/O requests should be scheduled for further processing based upon the data deduplication. A second level controller or a transmission controller that controls the I/O request may be implemented by the EDF queues and dispatcher 214 and the stats monitor 220. In particular, the stats monitor 220 detects the I/O rate and sends this data to the controller 210 to further enable the controller to schedule each I/O request. The EDF queues and dispatcher 214 monitors the latency of each I/O request based upon the latency requirement assigned to each I/O request. Thereby, the lower level dispatcher 214 avoids congestion in the storage system. Deduplication controls the storage condition and I/O request throughput, so that the latency can be controlled. For example, in the case where two I/O request come in, where the latency requirement for the first is 10 milliseconds and the latency requirement for second is 1 millisecond. Accordingly, the EDF queues and dispatcher 214 includes a software routine that places the second I/O request first in the queue, because its deadline according to the latency requirement must be achieved. That is, the latency requirement of 1 millisecond must be achieved prior to a latency requirement of 10 milliseconds. Afterwards, the EDF queues and dispatcher 214 places the first I/O request in the queue, because its latency requirement is 10 milliseconds. Therefore, the second I/O request, having the 1 millisecond latency requirement, is scheduled first. As a result, the second I/O request gets through faster and achieves a better response time.

The QoS architecture described herein repackages the storage I/O requests it receives; wherein, the I/O requests may be queued in the EDF queues and dispatcher 214 or the controller 210 may decide whether to schedule the I/O request or not. In particular, the controller 210 detects whether the I/O request satisfies a crediting criteria using a crediting scheme (described in detail below). The throughput associated with each I/O request may be set to be directly proportional to the priority of the client. When, for example, an I/O read request comes in, if it is within the SLA requirements, the controller 210 may schedule the I/O request and pass it on to the storage unit or the second portion of the QoS architecture, which lies at the bottom of the storage stack.

In one embodiment, the components that implement the dedupe aware QoS described herein may reside in the high level rate controller 210. In the alternative, the components for implementing the dedupe aware QoS may reside in one or more discrete modules external to the high level rate controller 210. There can be any type of arrangement of components within the QoS architecture below the high level rate controller 210 in any of the embodiments of the system. In other words, as would be apparent to one of ordinary skill in the art after reading this description, the various features and functionality described herein may be implemented in the QoS architecture using any arrangement components necessary to perform the deduplication and other QoS features (and functionality) based upon the deduplication; and can be implemented in one or more separate or shared modules in various combinations and permutations. Further, the method of providing dedupe aware QoS may be used for any storage stack, whether primary or secondary storage.

In some embodiments, the first level of architecture 200 may comprise the high level rate controller 210, which isolates the application I/O requests into different QoS queues based upon their SLA and schedules the I/O request based upon data deduplication. The I/O request may flow from any client: application, file, user, and the like according to the SLA. As shown, applications 202a-n couple to the storage system 200 to provide these I/O requests. One of the objectives of the high level rate controller 210 may be to make sure that the applications 202a-n running on the storage system do not overshoot their respective assigned bandwidths. Further, the high level rate controller 210 may avoid "noisy neighbor" and "starvation," where "noisy neighbor" refers to a rogue virtual machine (VM) that periodically monopolizes storage I/O resources to the performance detriment of all the other VM "tenants" in the environment; and "starvation" refers to the scenario where the application runs out of Fibre Channel credits that allows the application to transmit one frame of data. Additionally, this high level rate controller 210 may give credit to the application according to an associated reservation defined by the QoS. For example, three applications 202a-c may be assigned reservations of 100, 100, and 100, where the storage system has a bandwidth of 300. In operation, the high level rate controller 210 will not allow any application to overshoot its bandwidth. In addition, applications 202a-c may each possess a different priority. For example, one application (client) may have a higher priority where it is given a reservation of 150; while the second application may have a reservation of 100 and the third application of lower priority may have a reservation of 50.

In some embodiments, the dedupe software storage stack 212 may include a dedupe driver coupled to a dedupe counter (not shown). When the high level rate controller 210 allows the I/O request to be scheduled for processing, the I/O request is allowed to pass through the dedupe driver to the dedupe storage 216. In some embodiments, the dedupe driver may determine whether a particular I/O request is a duplicate or not. Accordingly, the dedupe counter located within the dedupe software storage stack 212 may keep track of the I/O requests that are duplicated and removed, which equals the dedupe count. In some embodiments, the dedupe counter may be implemented as a running counter, which indicates the number of deduped I/O reads not considered by QoS scheduler at any point of time. This type of dedupe counter may be implemented using a virtual clock. For example, when the dedupe count is 50 for a client that is assigned 100 units (reservation), the deduplication ratio is 50%. Using the admission crediting scheme disclosed below, the high level rate controller 210 can make use of the extra capacity (bandwidth). That is, the high level rate controller 210 can still reserve 50 more I/O requests even if the assigned bandwidth of the application has exhausted.

Although a virtual clock may be used, there are other mechanisms like a leaky bucket algorithm that may be used to perform the dedupe aware conditions for assigning credit to each I/O request. For example, the method for performing an I/O request may include implementing a bucket, using a counter, configured to receive a token corresponding to each I/O request received. The method may further include detecting when the number of tokens in the bucket is greater than a predetermined threshold. In addition, the method may including setting, in response to the detected tokens exceeding the threshold, the current clock tick equal to a first predetermined value and setting, in response to the detected tokens not exceeding the threshold, the current clock tick equal to a second predetermined value; wherein the first and second predetermined values are proportional to the dedupe count. In other words, as would be apparent to one of ordinary skill in the art after reading this description, the various features and functionality of the virtual clock may be implemented in the QoS architecture using the leaky bucket algorithm; and can be implemented in one or more separate or shared modules in various combinations and permutations.

In current QoS architectures, an admission control formula for assigning credit to an I/O request is as follows:

$$Tg(i,n) = MAX(Tg(i,n-1) + (1/C(i,t)), \text{currenttick}) \quad [9]$$

where, $T_g(i,n)$ represents a credit tag;

$T_g(i,n-1)$ represents the credit tag for the last I/O associated with the client;

$C(i,t)$ represents the total capacity bandwidth assigned to a client; and currenttick represents the current tick of the virtual clock;

i represents the number of the client (i.e. client 1, i=1).

This current crediting algorithm may be implemented in software based upon the virtual clock algorithm as the following instructions:

```
{
   app_credits_tag(t) = app_credits_tlag(t-1) +
                        tags(iosize)/app_assigned_credits;
   if ((app__credit__tag(t) <= (current_tick + 1))
   {
      schedule_now = TRUE;
   }
}
``` where app_credits_tag (t) represents the credit tag;

app_credits_tag(t-1) represents the previous credit tag;

tags(iosize) represents the size of the I/O request;

app_assigned_credits represents the total capacity bandwidth assigned to the client; and schedule_now=TRUE represents I/O request being scheduled and allowed to pass.

Accordingly, when the value of app_credit_tag is less than or equal to the next clock tick (i.e. current_tick+1), the I/O request is allowed to pass to the storage stack for processing. However, this conventional method does not account for the data deduplication.

The system and method for implementing the QoS based upon deduplication data disclosed herein may possess the following admission control formula which accounts for the data deduplication count:

$$Tg(i, n) = \begin{cases} MAX\left(Tg(i, n-1) + \left(\frac{1}{C(i, t)}\right), \text{currenttick}\right) \text{ if } dc = 0 & [2] \\ MAX\left(\left(Tg(i, n-1) - \frac{dc}{C(i, t)}\right) + \\ \left(\frac{1}{C(i, t)}\right), \text{currenttick}\right) \text{ if } dc > 0 & [3] \end{cases}$$

where dc represents the dedupe count. Although the values for the current clock tick (the currenttick) and the dedupe counter (dc) may be given as fixed amounts, these variables represent a particular point in time. That is, the value of dedupe counter may be dynamic, where it may be a rapidly changing value.

In some embodiments, the high level rate controller 210 may include a software routine having an algorithm which determines whether the I/O request may be scheduled or not. The high level rate controller 210 may take into account the running dedupe counter while assigning the credit tags to each I/O request. The system and method for dedupe-aware QoS described herein may be implemented in software using the following instructions associated with the crediting algorithm given above:

```
{
    app_credits_tag(t) =  app_credits_tag(t-1) +
                          tags(iosize)/app_assigned_credits;
    if(dedupe_counter)
    {
        app_credits_tag(t) -= dedupe_counter/app_assigned_credits;
        dedupe_counter = 0;
    }
    if((app_credits_tag(t) <= (current_tick + 1))
    {
        schedule_now = TRUE;
    }
}
```

As shown, now the software implementation includes instructions that account for the amount of data deduplicated. In particular, where no data duplication exists, the processor of the controller jumps to the second "if" statement to detect whether the credit tag is less than the next clock tick. In the case where the credit tag is less than the next clock tick, the processor will release the I/O request for scheduling. When data deduplication exists, the controller generates the deduplication ratio (i.e. dedupe_counter/app_assigned_credits) and resets the deduplication counter to zero. The controller may also detect whether the credit tag is less than the next clock tick and, in response to this statement being true, release the I/O request to be scheduled as opposed to being queued.

The component providing the dedupe aware QoS may be implemented using any form of hardware, software, or combination thereof. It may be implemented as a discrete module or the functions and features described with regards to the high level rate controller 210 can be shared in part or in total among one or more modules. In other words, as would be apparent to one of ordinary skill in the art after reading this description, the various features and functionality described herein may be implemented in any given application and can be implemented in one or more separate or shared modules in various combinations and permutations.

In one example, given app_assigned_credits=100, current tick=6 and dedupe ratio=50% (which means 50 I/O requests are deduped), the conventional QoS approach does not allow the 101$^{th}$ I/O request since the current algorithm indicates that the app_credits_tag will be equal to 7.01 (i.e. app_credit_tag=7+1/100=7.01), which is greater than the next clock tick (the current time of the virtual clock incremented by one; i.e. current_tick+1). For the method of dedupe aware QoS described herein, however the high level rate controller 210 may tag the 101$^{th}$ I/O request when the dedupe count is greater than zero. For example, the I/O request may be tagged as 6.51, where the dedupe ratio=50/100 and the tag ratio=1/100 (i.e. app_credits_tag(t)=7−50/100+1/100=6.51), which is less than the next clock tick (or the current time of the virtual clock incremented by one) (i.e. current_tick+1=7). Accordingly, the high level rate controller 210 may allow the I/O request to pass on to be process as opposed to being queued. Further, the high level rate controller 210 may send a signal to the dedupe software storage stack 212 to reset the dedupe counter to zero. As a result, forty nine (49) more I/O requests may be allowed by the high level rate controller 210 to pass. Thereby, the total number of I/O requests processed is increased from 100 to 150 I/O requests. This dedupe aware QoS implementation enables that the 50 deduped I/O requests to use the storage in accordance with the original assigned capacity.

Continuing with this example given above (where the dedupe ratio is 50% and three clients exist each having equal priority and an assigned bandwidth of 100), when an I/O request is asserted by an application 202a-n, there are two parts to the credit assigning algorithm noted above that may be used to determine whether the I/O request, whether read or write, may be scheduled to be processed. The admission control formula takes into account the deduped I/O requests, such that this knowledge may be used to distribute the extra bandwidth.

In operation, the high level rate controller 210 may use a virtual clock for the dedupe aware credit assignment. When the virtual clock runs, the system may be at time t0, t1, t2, and the like, where the time difference can be a pre-set value. For example, every tick of the virtual clock may be one second apart. Thus, every one second, the high level rate controller 210 wakes up and looks at the different queues of the EDF queues and dispatcher 214. The high level rate controller 210 may then admit the I/O requests to the underlying storage based upon the assigning credit algorithm and implementation given above. In particular, the high level rate controller 210 may look at the demand for each application for every tick of the virtual clock and allows a certain number of I/O requests to pass to the storage stack based upon the SLA. The high level rate controller 210 may use the dedupe aware credit assignment formulas given above to tag every I/O request. For example, any client may be given credits by the high level rate controller 210 using the credit assignment implementation noted above. When the first I/O request comes in (where the clock is at the first tick or the currenttick is one), the last tag $T_g(i,n-1)$ is 0. Therefore, the reciprocal of the total capacity bandwidth assigned to the client (i.e. $1/C(i,t)$) is 1/10. When the controller 210 performs the calculation of the first line of the formula (i.e. Equation [2], the following is derived: $T_g(i,n-1)+(1/C(i,t))=0+0.1=0.1$. The maximum between 0.1 and the currenttick (1) is one (i.e. MAX (1, currenttick)=MAX (0.1, 1)=1). When the outcome is less than the next clock tick (currenttick+1), the high level rate controller 210 may allow the I/O request to pass through. At this point, the controller 210 may use the part of the formula that does not take into account the dedupe counter (i.e. Equation [2], because the assigned bandwidth limit of 10 has not been reached. However, when the 11th I/O request comes in controller 210, Equation [2] will not allow the I/O request to pass on to the storage stack. As part of the procedure to account for the deduplication, the high level rate controller 210 switches to the second part of the formula (i.e. Equation [3]). For example, when the dedupe count is five (i.e. dc=5), the controller 210 may use the second part of the crediting assignment formula. In particular, the controller 210 may detect the maximum value between the sum of the previous tag, a negative value of the dedupe ratio, and the tag ratio over the next clock tick (the current tick incremented by one). For this example, the controller 210 detects the maximum is 1 (i.e. MAX (0−5/10)+1/10, currenttick)=MAX (5/10, 1)). The result is that when deduplication exists, the client is given credit to be applied to the bandwidth, enabling the deduplicated storage to be reallocated.

In another example, three applications ($A_1$, $A_2$, and $A_3$) are each assigned 100 bandwidth credits and the dedupe counter associated with each application $A_{1-3}$ is 0, 0, and 50 respectively, where the currenttick=6 and the next tick=7 (the current tick incremented by one). The high level rate controller 210 may be configured to operate such that when the tag is less than the next tick, the controller 210 allows the I/O request [i.e. $T_g(i,n)=((6+1/100)$, which is less than or equal to 7) $T_g(i,n)=6.01<=7$]. The statement schedule_now=TRUE means that the I/O request will proceed to be scheduled instead of being queued. This holds true for the I/O requests up to 100. However, for the $101^{st}$ I/O request for the first and second application ($A_1$ and $A_2$), the credit tag may be represented as follows: $T_g(i,n)=((6+101/100)$ is less than or equal to $7)=7.01<=7$. As such, the I/O request of either application ($A_1$ or $A_2$) will not be allowed. That is, since the value on left hand side (7.01) is greater than 7, the high level rate controller 210 will not allow I/O request. However, for the third application $A_3$, where the deduplication counter is 50, an extra 50 I/O requests may be assigned using the second portion of the dedupe aware formula (Equation [3]). The admission control method of controller 210 may generate a credit tag as follows: $T_g(i,n)=((6-0/100+1/100)$ is less than equal to $7)=6.01<=7$. As a result, the controller 210 will allow the I/O request for the third application $A_3$. Since the first two applications ($A_1$ and $A_2$) have a dedupe count of 0, no extra storage credit may be granted. However, the dedupe count of application $A_3$ is 50. Therefore, the tag credit for the third application $A_3$ is as follows $T_g(i,n)=((6-50/100+1/100)$ is less than equal to $7)=5.51<=7$, I/O. Since the tag valued at 5.51 is less than 7, the controller 210 will allow the I/O request for the third application $A_3$.

For $150^{th}$ I/O request, the tag credit granted by controller 210 is as follows: $T_g(i,n)=((6-50/100+150/100$ is less than equal to $7)=7<=7$. As a consequence for the $150^{th}$ I/O request, the controller 210 will also allow the I/O request for the third application $A_3$. However, for $151^{st}$ I/O request that comes into the server, the credit tag is as follows: $T_g(i,n)= (6-50/100+151/100$ is less than equal to $7)=7.01<=7$. Since 7.01 is not less than 7, the controller will not allow the I/O request. That is, for application $A_3$, the dedupe aware controller 210 may schedule up to 150 I/O requests, since its dedupe count is 50. For this example, of the 100 I/O requests that reached to the storage, 50 were duplicates. Thereby, the storage has been utilized at its maximum capacity.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 3:
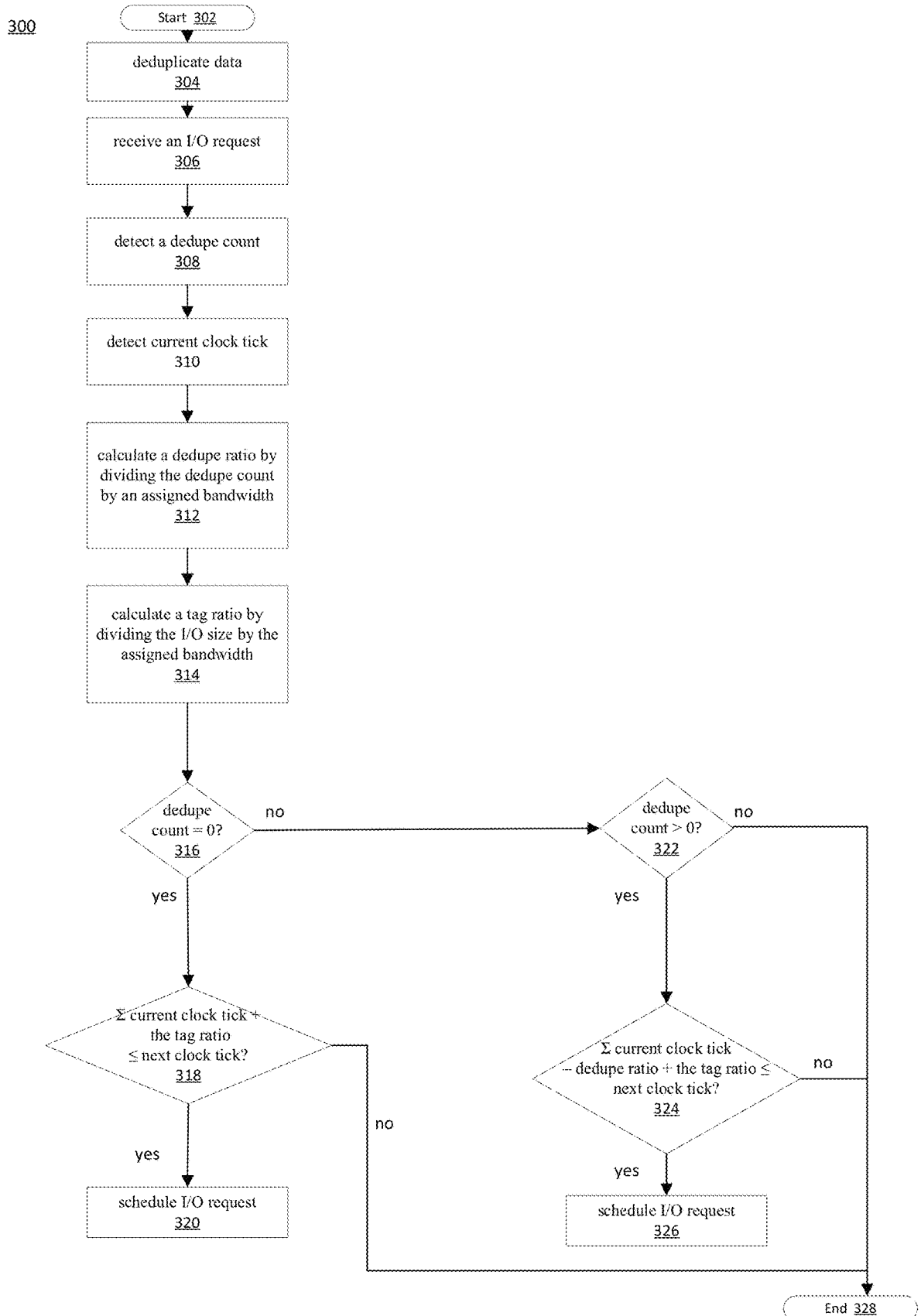
FIG. 3 is an exemplary flow diagram of a method of implementing a Quality of Service based upon data deduplication within a networked system in accordance with some embodiments.

FIG. 3 is an exemplary flow diagram of a method 300 of implementing a Quality of Service based upon data deduplication within a networked system in accordance with some embodiments. In an actions 302 and 304, the method starts with the dedupe aware QoS storage system 100 deduplicating data. The dedupe aware QoS storage system 100 may deduplicate the data at any point in the process, making the assignment of the QoS based upon the deduplicated data a dynamic process. For example, in one embodiment, deduplication may be provided by dividing multiple files into file segments and then detecting at least one file segment that is identical to some other file segment. The method may include maintaining multiple reference objects (such as reference lists and/or reference counts) that each indicate whether one or more backed-up files currently reference a particular file segment.

In an action 306, an I/O request may be received by the server 140 *a-b* from any client 110*a-c*. The deduplication manager 142 may detect the dedupe count in an action 308. In an action 312, the storage controller 144 may calculate a dedupe ratio by dividing the dedupe count by an assigned bandwidth (reservation). In an action 314, the storage controller 144 may calculate a tag ratio by dividing the I/O size by the assigned bandwidth. For example, when the dedupe count is 50 for a client that is assigned 100 units (reservation), the deduplication ratio is 50%; and thereby, the high level rate controller can make use of the extra capacity (bandwidth).

Accordingly, in a decision action 316, the storage controller may detect whether the dedupe count is equal to zero (0), where no deduplication exists. When the dedupe count is equal to 0, the storage controller may detect whether the sum of the current clock tick and the tag ratio is less than or equal to the next virtual clock tick (or the current clock tick incremented by one) in a decision action 318. When the sum is less than or equal to the current clock tick incremented by one, the storage controller may release the I/O request to be scheduled in an action 320. When the sum is not less than or equal to the current clock tick incremented by one, the process ends in action 328.

When the dedupe count is not equal to 0, the storage controller may detect whether the dedupe count is greater than zero (0) in a decision action 322. When the dedupe count is greater than zero representing the existence of deduplication, the storage controller may detect whether the sum of the current clock tick, a negative value of the dedupe ratio, and the tag ratio is less than or equal to the next clock tick (the current clock tick incremented by one) in a decision action 324. When the sum is less than or equal to the current clock tick incremented by one, the storage controller may release the I/O request to be scheduled in an action 326. When the sum is not less than or equal to the next clock tick, the process ends in action 328.

Although not shown in FIG. 3, the method may be implemented using a leaky bucket algorithm to perform the dedupe aware conditions for assigning credit to each I/O request in place of the virtual clock implementation shown. For example, the method for performing an I/O request may include implementing a bucket, using a counter, configured to receive a token corresponding to each I/O request received. The method may further include detecting when the number of tokens in the bucket is greater than a predetermined threshold. In addition, the method may including setting, in response to the detected tokens exceeding the threshold, the current clock tick equal to a first predetermined value and setting, in response to the detected tokens not exceeding the threshold, the current clock tick equal to a second predetermined value; wherein the first and second predetermined values are proportional to the dedupe count.

Figure 4:
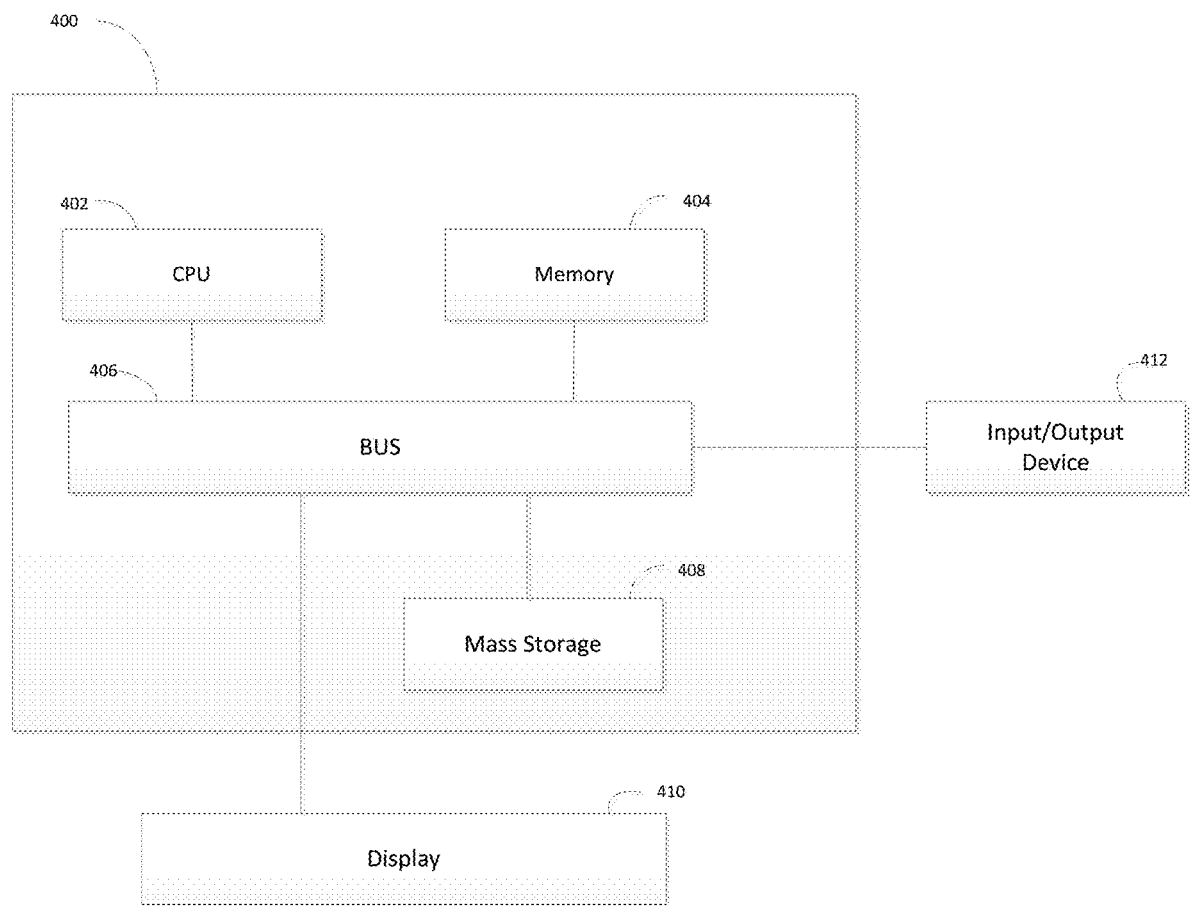
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for implementing a Quality of Service based upon data deduplication within a networked system in accordance with some embodiments. The computing device includes a central processing unit (CPU) 402, which is coupled through a bus 406 to a memory 404, and mass storage device 408. Mass storage device 408 represents a persistent data storage device such as a floppy disc drive or a fixed disc drive, which may be local or remote in some embodiments. The mass storage device 408 could implement a backup storage, in some embodiments. Memory 404 may include read only memory, random access memory, etc. Applications resident on the computing device may be stored on or accessed through a computer readable medium such as memory 404 or mass storage device 408 in some embodiments. Applications may also be in the form of modulated electronic signals modulated accessed through a network modem or other network interface of the computing device. It should be appreciated that CPU 402 may be embodied in a general-purpose processor, a special purpose processor, or a specially programmed logic device in some embodiments.

Display 412 is in communication with CPU 402, memory 404, and mass storage device 408, through bus 406. Display 412 is configured to display any visualization tools or reports associated with the system described herein. Input/output device 410 is coupled to bus 406 in order to communicate information in command selections to CPU 402. It should be appreciated that data to and from external devices may be communicated through the input/output device 410. CPU 402 can be defined to execute the functionality described herein to enable the functionality described with reference to FIGS. 1-3. The code embodying this functionality may be stored within memory 404 or mass storage device 408 for execution by a processor such as CPU 402 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of storage management, comprising:
   deduplicating data;
   receiving an Input/Output (I/O) request;
   detecting a count associated with the deduplicated data for an application; and
   scheduling the I/O request associated with a storage unit based upon the detected count, including:
      detecting a current clock tick;
      calculating a dedupe ratio by dividing the detected count by an assigned bandwidth;
      calculating a tag ratio by dividing an I/O size by the assigned bandwidth;
      processing, when the detected count is equal to 0, the I/O request when a sum of the current clock tick, and the tag ratio are less than or equal to a next clock tick; and
      processing, when the detected count is greater than 0, the I/O request when a sum of the current clock tick, a negative value of the ratio, and the tag ratio are less than or equal to the next clock tick;
   wherein bandwidth is assigned to the I/O request based upon the detected count and a Quality of Service (QoS) policy associated with packet flow to account for deduplication.

2. The method of claim 1, wherein the deduplicating data comprises:
   fingerprinting data;
   identifying the duplicate data using the fingerprints of data;
   mapping a location associated with the duplicate data;
   storing the mapping; and
   deleting the duplicate data from storage.

3. The method of claim 1, wherein the detecting the count comprises:
   retrieving a map of locations associated with duplicated data;
   counting the mapped locations associated with a client; and
   setting the detected count to equal the mapped location count.

4. The method of claim 1, wherein detecting the current clock tick comprises:
   setting a virtual clock; and
   reading the virtual clock at a predetermined time to generate the current clock tick.

5. A method of storage management, comprising:
   deduplicating data;
   receiving an Input/Output (I/O) request;
   detecting a count associated with the deduplicated data for an application; and scheduling the I/O request associated with a storage unit based upon the detected count and other I/O requests that have been received, including:
implementing a bucket, by a counter, configured to receive a token corresponding to each of the I/O requests and detect a number of tokens received;
detecting when the number of tokens in the bucket is greater than a predetermined threshold;
setting, in response to the detected number of tokens exceeding the predetermined threshold, a current clock tick equal to a first predetermined value;
setting, in response to the detected number of tokens not exceeding the predetermined threshold, the current clock tick equal to a second predetermined value;
calculating a dedupe ratio by dividing the detected count by an assigned bandwidth;
calculating a tag ratio by dividing an I/O size by the assigned bandwidth;
processing, when the detected count is equal to 0, the I/O request when a sum of the current clock tick, and the tag ratio are less than or equal to a next clock tick; and
processing, when the count is greater than 0, the I/O request when a sum of the current clock tick, a negative value of the dedupe ratio, and the tag ratio are less than or equal to the next clock tick; and
wherein bandwidth is assigned to the I/O request based upon the detected count and a Quality of Service (QoS) policy associated with packet flow to account for deduplication.

6. A storage controller comprising:
a memory; and
a processor configured to:
deduplicate data;
receive an Input/Output (I/O) request;
detect a count associated with the deduplicated data for an application; and
schedule the I/O request in a storage unit based upon the detected count, including:
detect a current clock tick;
calculate a dedupe ratio by dividing the detected count by an assigned bandwidth;
calculate a tag ratio by dividing an I/O size by the assigned bandwidth;
process, when the detected count is equal to 0, the I/O request when a sum of the current clock tick, and the tag ratio are less than or equal to a sum of the current clock tick and 1; and
process, when the detected count is greater than 0, the I/O request when a sum of the current clock tick, a negative value of the dedupe ratio, and the tag ratio are less than or equal to a sum of the current clock tick and 1; and
wherein bandwidth is assigned to the I/O request based upon the detected count and a Quality of Service (QoS) policy associated with packet flow to account for deduplication.

7. The storage controller of claim 6, wherein the processor for deduplicating data is configured to:
fingerprint data;
identify the duplicate data using the fingerprints of data;
map a location associated with the duplicate data;
store the map; and
delete the duplicate data from storage.

8. The storage controller of claim 6, wherein the processor for detecting the count is configured to:
retrieve a map of locations associated with duplicated data;
count the mapped locations associated with a client; and
set the detected count to equal the mapped location count.

9. A storage controller comprising:
a memory; and
a processor configured to:
deduplicate data;
receive an Input/Output (I/O) request;
detect a count associated with the deduplicated data for an application; and
schedule the I/O request in a storage unit, based upon the detected count and other I/O requests that have been received, to:
implement a bucket, by a counter, configured to receive a to ken corresponding to each I/O request received and detect a number of tokens received;
detect when the number of tokens in the bucket is greater than a predetermined threshold;
set, in response to the detected number of tokens exceeding the predetermined threshold, the current clock tick equal to a first predetermined value;
set, in response to the detected number of tokens not exceeding the predetermined threshold, a current clock tick equal to a second predetermined value;
calculate a dedupe ratio by dividing the detected count by an assigned bandwidth;
calculate a tag ratio by dividing an I/O size by the assigned bandwidth;
process, when the detected count is equal to 0, the I/O request when a sum of the current clock tick, and the tag ratio are less than or equal to a sum of the current clock tick and 1; and
process, when the detected count is greater than 0, the I/O request when a sum of the current clock tick, a negative value of the dedupe ratio, and the tag ratio are less than or equal to a sum of the current clock tick and 1.

10. A non-transitory computer-readable medium including code for performing a method, the method comprising:
deduplicating data;
receiving an Input/Output (I/O) request;
detecting a dedupe count associated with the deduplicated data for an application; and
scheduling the I/O request in a storage unit based upon the detected dedupe count, including:
detecting a current clock tick;
calculating a dedupe ratio by dividing the dedupe count by an assigned bandwidth;
calculating a tag ratio by dividing an I/O size by the assigned bandwidth;
processing, when the dedupe count is equal to 0, the I/O request when a sum of the current clock tick, and the tag ratio are less than or equal to a next clock tick; and
processing, when the dedupe count is greater than 0, the I/O request when a sum of the current clock tick, a negative value of the dedupe ratio, and the tag ratio are less than or equal to the next clock tick;
wherein bandwidth is assigned to the I/O request based upon the detected dedupe count and a Quality of Service (QoS) policy associated with packet flow to account for deduplication.

11. The non-transitory computer-readable medium of claim 10, wherein the deduplicating data comprises:
fingerprinting data;
identifying the duplicate data using the fingerprints of data;
mapping a location associated with the duplicate data;

storing the mapping; and
deleting the duplicate data from storage.

12. The non-transitory computer-readable medium of claim 10, wherein the detecting dedupe count comprises:
retrieving the mapping;
counting mapped locations associated with a client; and
setting the dedupe count to equal the mapped location count.

13. A non-transitory computer-readable medium including code for performing a method, the method comprising:
deduplicating data;
receiving an Input/Output (I/O) request;
detecting a dedupe count associated with the deduplicated data for an application; and
scheduling the I/O request in a storage unit based upon the dedupe count and other I/O requests that have been received, including:
implementing a bucket, by a counter, configured to receive a token corresponding to each I/O request received and detect a number of tokens received;
detecting when the number of tokens in the bucket is greater than a predetermined threshold;
setting, in response to the detected number of tokens exceeding the predetermined threshold, a current clock tick equal to a first predetermined value;
setting, in response to the detected number of tokens not exceeding the predetermined threshold, the current clock tick equal to a second predetermined value;
calculating a dedupe ratio by dividing the dedupe count by an assigned bandwidth;
calculating a tag ratio by dividing an I/O size by the assigned bandwidth;
processing, when the dedupe count is equal to 0, the I/O request when a sum of the current clock tick, and the tag ratio are less than or equal to a sum of the current clock tick and 1; and
processing, when the dedupe count is greater than 0, the I/O request when a sum of the current clock tick, a negative value of the dedupe ratio, and the tag ratio are less than or equal to a sum of the current clock tick and 1;
wherein the deduplicating data comprises:
fingerprinting data;
identifying the duplicate data using the fingerprints of data;
mapping a location associated with the duplicate data;
storing the mapping; and
deleting the duplicate data from storage.

\* \* \* \* \*

UNITED STATES PATENT AND TRADEMARK OFFICE
CERTIFICATE OF CORRECTION

PATENT NO. : 10,540,341 B1
APPLICATION NO. : 15/087345
DATED : January 21, 2020
INVENTOR(S) : Prasann Wakhare et al.

Page 1 of 1

It is certified that error appears in the above-identified patent and that said Letters Patent is hereby corrected as shown below:

In the Claims

In Column 17, Line 10, please replace "dock" with --clock--

Signed and Sealed this
Thirty-first Day of March, 2020

Andrei Iancu
*Director of the United States Patent and Trademark Office*